United States Patent
Goldfarb

(10) Patent No.: US 10,091,715 B2
(45) Date of Patent: Oct. 2, 2018

(54) SYSTEMS AND METHODS FOR PROTOCOL-BASED IDENTIFICATION OF ROGUE BASE STATIONS

(71) Applicant: Verint Systems Ltd., Herzliya Pituach (IL)

(72) Inventor: Eithan Goldfarb, Ness Ziona (IL)

(73) Assignee: Verint Systems Ltd., Herzelia, Pituach (IL)

( * ) Notice: Subject to any disclaimer, the term of this patent is extended or adjusted under 35 U.S.C. 154(b) by 0 days.

(21) Appl. No.: 15/369,153

(22) Filed: Dec. 5, 2016

(65) Prior Publication Data
US 2017/0150426 A1    May 25, 2017

Related U.S. Application Data

(63) Continuation of application No. 14/527,891, filed on Oct. 30, 2014, now Pat. No. 9,525,994.

(30) Foreign Application Priority Data

Oct. 30, 2013   (IL) .......................................... 229153

(51) Int. Cl.
*H04W 48/16*   (2009.01)
*H04W 8/26*   (2009.01)
(Continued)

(52) U.S. Cl.
CPC ............. *H04W 48/16* (2013.01); *H04W 4/14* (2013.01); *H04W 8/26* (2013.01); *H04W 24/08* (2013.01); *H04W 60/04* (2013.01)

(58) Field of Classification Search
CPC ..... H04W 12/12; H04W 88/08; H04W 12/06; H04W 16/08; H04L 63/1408; H04L 63/1466; H04L 41/12; H04L 63/1416
See application file for complete search history.

(56) References Cited

U.S. PATENT DOCUMENTS

| | | | |
|---|---|---|---|
| 6,181,925 B1 * | 1/2001 | Kaminsky | H04W 12/12 455/410 |
| 7,756,510 B2 | 7/2010 | Lee et al. | |

(Continued)

FOREIGN PATENT DOCUMENTS

WO       2010/116292       10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Matthew C Sams
(74) *Attorney, Agent, or Firm* — Meunier Carlin & Curfman, LLC

(57) ABSTRACT

A rogue base station detection system that receives communication that is exchanged in accordance with a communication protocol between one or more base stations and one or more communication terminals and detects a presence of a rogue base station based on detecting a signaling message that appears more than once in the communication, even though the signaling message is expected to appear only once in accordance with the communication protocol.

20 Claims, 2 Drawing Sheets

(51) Int. Cl.
*H04W 60/04* (2009.01)
*H04W 4/14* (2009.01)
*H04W 24/08* (2009.01)

(56) References Cited

U.S. PATENT DOCUMENTS

| | | | |
|---|---|---|---|
| 7,885,639 B1 | 2/2011 | Satish et al. | |
| 7,965,701 B1* | 6/2011 | Toennis | H04L 63/0428 370/352 |
| 7,965,842 B2 | 6/2011 | Whelan et al. | |
| 8,351,900 B2 | 1/2013 | Lotvonen et al. | |
| 8,620,315 B1 | 12/2013 | Merritt et al. | |
| 9,060,299 B2 | 6/2015 | Morad et al. | |
| 2002/0138635 A1 | 9/2002 | Redlich et al. | |
| 2004/0003285 A1 | 1/2004 | Whelan et al. | |
| 2004/0023640 A1 | 2/2004 | Ballai | |
| 2004/0103282 A1 | 5/2004 | Meier et al. | |
| 2004/0162070 A1* | 8/2004 | Baral | H04L 63/1425 455/435.1 |
| 2005/0060434 A1 | 3/2005 | Fazal et al. | |
| 2005/0075070 A1* | 4/2005 | Crilly, Jr. | H04W 24/00 455/13.3 |
| 2005/0114649 A1 | 5/2005 | Challener et al. | |
| 2005/0176445 A1* | 8/2005 | Qu | H04W 72/005 455/458 |
| 2007/0058601 A1 | 3/2007 | Davis et al. | |
| 2007/0073868 A1 | 3/2007 | Nelson et al. | |
| 2007/0115886 A1 | 5/2007 | Davis et al. | |
| 2007/0121596 A1* | 5/2007 | Kurapati | H04L 29/06027 370/356 |
| 2007/0183375 A1 | 8/2007 | Tiwari | |
| 2008/0176567 A1 | 7/2008 | Oba et al. | |
| 2009/0100262 A1* | 4/2009 | Yoo | H04L 63/08 713/155 |
| 2011/0086614 A1 | 4/2011 | Brisebois et al. | |
| 2011/0150223 A1* | 6/2011 | Qi | H04W 12/04 380/273 |
| 2012/0142347 A1 | 6/2012 | Morad et al. | |
| 2012/0304297 A1* | 11/2012 | Chung | H04L 63/1416 726/23 |
| 2013/0344844 A1 | 12/2013 | Goldfarb | |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

"Cell Scanning and Catcher Detection in unnoticeable pocket size," NetHawk C2, Data sheet, version 1.4, EXFO, 2010, 4 pages.

Girardin, F., et al., "Detecting air travel to survey passengers on a worldwide scale," Journal of Location Based Services, 26 pages.

Meyer, U., et al., "On the Impact of GSM Encryption and Man-in-the-Middle Attacks on the Security of Interoperating GSM/UMTS Networks," IEEE, 2004, 8 pages.

Vedaldi, A., "An implementation of SIFT detector and descriptor," University of California at Los Angeles, 7 pages.

* cited by examiner

SYSTEMS AND METHODS FOR PROTOCOL-BASED IDENTIFICATION OF ROGUE BASE STATIONS

RELATED APPLICATIONS

This application is a continuation of U.S. patent application Ser. No. 14/527,891, filed Oct. 30, 2014, and entitled "SYSTEMS AND METHODS FOR PROTOCOL-BASED IDENTIFICATION OF ROGUE BASE STATIONS," the contents of which are hereby incorporated by reference in their entirety.

FIELD OF THE DISCLOSURE

The present disclosure relates generally to communication monitoring, and particularly to systems and methods for identifying rogue base stations.

BACKGROUND OF THE DISCLOSURE

Rogue base stations are used in various applications that involve tracking, eavesdropping and/or collecting information on cellular phones or other mobile communication terminals. Some rogue base stations solicit a tracked terminal to reveal its International Mobile Subscriber Identifier (IMSI). Therefore, rogue base stations are commonly referred to as "IMSI catchers."

Examples of IMSI catching techniques are described, for example, by Strobel in "IMSI Catcher," Jul. 13, 2007, by Asokan et al., in "Man-in-the-Middle Attacks in Tunneled Authentication protocols," the 2003 Security Protocols Workshop, Cambridge, UK, Apr. 2-4, 2003, and by Meyer and Wetzel in "On the Impact of GSM Encryption and Man-in-the-Middle Attacks on the Security of Interoperating GSM/UMTS Networks," proceedings of the $15^{th}$ IEEE International Symposium on Personal, Indoor and Mobile Radio Communications, Barcelona, Spain, Sep. 5-8, 2004, pages 2876-2883, which are all incorporated herein by reference.

Several techniques for detecting IMSI catchers are known in the art. For example, the Open Source Mobile Communication Base Band (OsmocomBB), or Open Source GSM Baseband project, supports free software that can be uploaded to a mobile phone. The program configures a cellular phone to detect and report to the subscriber when the phone is being tracked by an IMSI catcher. Nethawk Oyj (Oulu, Finland) offers a product called Nethawk-C2 that performs cell scanning and IMSI catcher detection.

U.S. Pat. No. 8,351,900, whose disclosure is incorporated herein by reference, describes techniques for detecting a rogue base station. A disclosed method receives signaling messages by a mobile apparatus at least from one base station of a cellular network, interprets a received signaling message, searches for an anomaly with at least one signaling parameter of the received signaling message from a first base station to a known comparison signaling parameter, and gives an alert if the comparison gives an unequal result concerning at least one signaling parameter.

SUMMARY OF THE DISCLOSURE

An embodiment that is described herein provides a method, including predefining at least one communication feature that, when supported by a base station indicates that the base station is innocent and when not supported by the base station indicates that the base station is suspected of being rogue. A communication session is established with a suspected base station. During the communication session, the base station is requested to perform the predefined communication feature. The suspected base station is classified as innocent or rogue depending on whether the suspected base station performs the requested communication feature.

In some embodiments, the at least one communication feature includes a plurality of communication features, and the method includes sequentially requesting the base station to perform the communication features in the plurality. In an embodiment, classifying the suspected base station includes deciding that the suspected base station is rogue in response to detecting that the suspected base station is unable to perform the requested communication feature.

In various embodiments, requesting the base station to perform the communication feature may include requesting the base station to provide a data service, requesting the base station to activate frequency hopping, requesting the base station to carry out a call setup signaling process, requesting the base station to accept an incoming call, requesting the base station to perform a hand-over process, and/or requesting the base station to activate an Unstructured Supplementary Service Data (USSD) feature. In a disclosed embodiment, the method includes scanning a plurality of base stations so as to construct a list of suspected base stations, and establishing communication sessions and classifying each of the suspected base stations on the list.

There is additionally provided, in accordance with an embodiment that is described herein, apparatus including a transmitter, a receiver and a processor. The transmitter and the receiver are configured to communicate with one or more base stations. The processor is configured to predefine at least one communication feature that, when supported by a base station indicates that the base station is innocent and when not supported by the base station indicates that the base station is suspected of being rogue, to establish a communication session with a suspected base station, to request the base station, during the communication session, to perform the predefined communication feature, and to classify the suspected base station as innocent or rogue depending on whether the suspected base station performs the requested communication feature.

There is also provided, in accordance with an embodiment that is described herein, a method including receiving communication that is exchanged in accordance with a communication protocol between one or more base stations and one or more communication terminals. Presence of a rogue base station is detected by detecting in the communication a signaling message that appears more than once, even though the signaling message is to appear only once in accordance with the communication protocol.

In various embodiments, detecting the signaling message includes detecting a duplicate registration process performed using a same Temporary Mobile Subscriber Identity (TMSI), detecting a duplicate call setup process, and/or detecting a duplicate Short Message Service (SMS) transaction.

There is further provided, in accordance with an embodiment that is described herein, apparatus including a receiver and a processor. The receiver is configured to receive communication that is exchanged in accordance with a communication protocol between one or more base stations and one or more communication terminals. The processor is configured to detect a presence of a rogue base station by detecting in the communication a signaling message that appears more than once, even though the signaling message is to appear only once in accordance with the communication protocol.

The present disclosure will be more fully understood from the following detailed description of the embodiments thereof, taken together with the drawings in which:

DETAILED DESCRIPTION OF EMBODIMENTS

Overview

Figure 1:
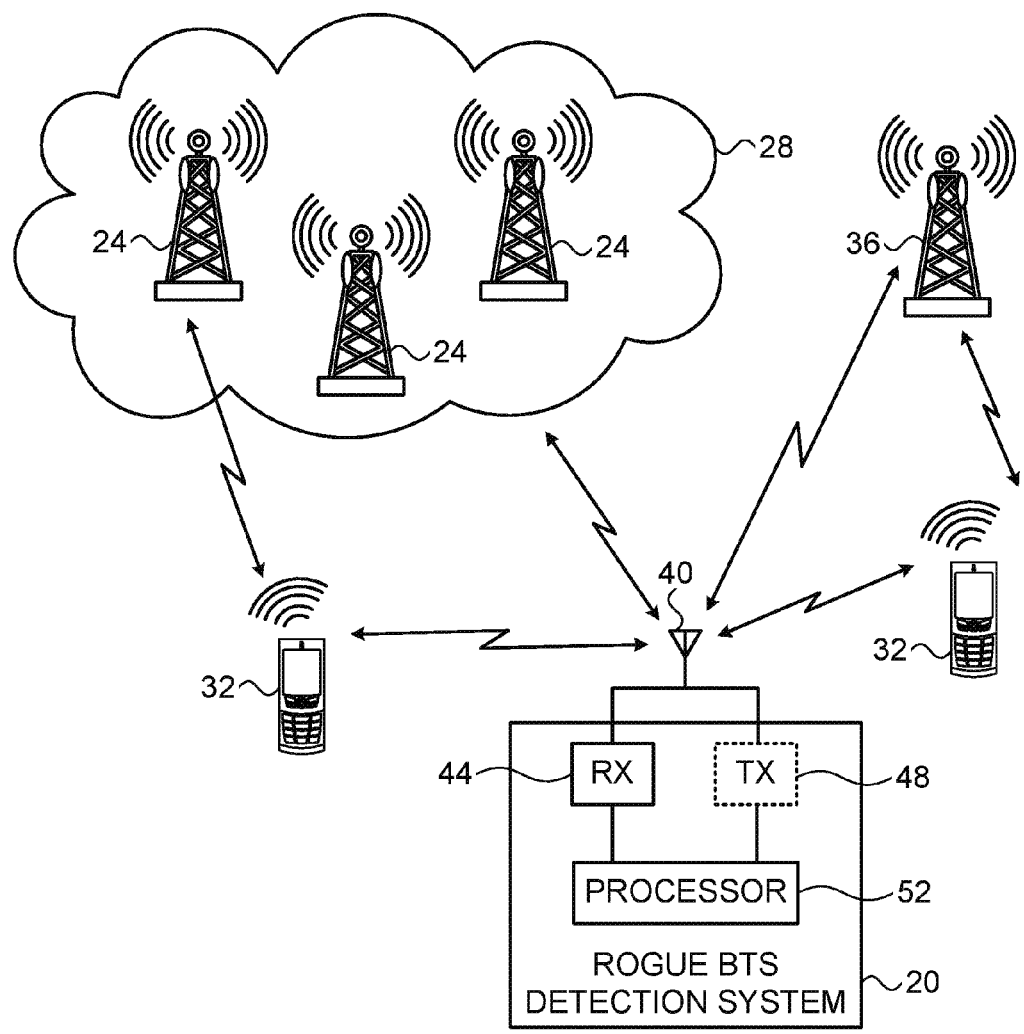
FIG. 1 is a block diagram that schematically illustrates a system for rogue base station detection, in accordance with an embodiment that is described herein.

Rogue base stations typically solicit terminals to reselect and start communicating with the rogue base station. Solicitation may be performed, for example, by transmitting downlink signals whose transmission parameters (e.g., high power) make the rogue base station an attractive candidate for cell reselection. Typically, although not necessarily, a rogue base station rejects most of the reselecting terminals, since they are not designated as targets.

These two properties (attractive transmission parameters and frequent rejection of terminals) can be used as criteria for identifying rogue base stations. In some cases, however, an advanced rogue base station may evade such detection criteria. Moreover, frequent rejection of terminals is not an exclusive property of rogue base stations. Innocent Femto-cells, for example, and in particular femto-cells having closed subscriber groups, are also characterized by frequent rejection of reselection attempts.

Embodiments that are described herein provide improved methods and systems for detecting rogue base stations. In some embodiments, a rogue base station detection system establishes a communication session with a suspected base station, and verifies whether the base station is rogue or innocent by testing which advanced communication features are supported by the base station. The rationale behind this technique is that a rogue base station is typically simpler in functionality than an innocent base station. For example, a rogue base station typically has no need to support features such as data services or frequency hopping. As another example, since a rogue base station is typically detached from any cellular network, it cannot support hand-off to innocent cells.

In some embodiments, the detection system holds a definition of one or more communication features that are supported by innocent base stations and not by rogue base stations. During a communication session with a suspected base station, the detection system requests the base station to activate these communication features. If the base station does not support the features in question, it is likely to be rogue. In practice, it is not always possible to decide whether a base station is rogue on the basis of a single communication feature. In such cases, the system may progressively test for support of multiple communication features, and gradually increase the confidence of the decision.

In alternative embodiments, the detection system passively monitors communication that is exchanged between base stations and terminals in accordance with a certain communication protocol. The detection system looks for signaling messages that appear more than once, even though they are expected to appear only once in accordance with the protocol. Duplicate signaling of this sort indicates with high likelihood that a rogue base station has cloned the transmission parameters of some innocent base station.

The detection techniques described herein are extremely difficult to evade, and are highly reliable in distinguishing between rogue base stations and innocent base stations. Some of the disclosed techniques are passive, and therefore undetectable by the rogue base station operator.

System Description

FIG. 1 is a block diagram that schematically illustrates a system 20 for rogue base station (BTS) detection, in accordance with an embodiment that is described herein. System 20 is typically deployed in a location that is to be protected from IMSI catchers and other rogue base stations. Typically, system 20 is within communication range of multiple base stations, one or more of which may be rogue. In the present example, system 20 is within range of four base stations—Three innocent base stations 24 that belong to a cellular network 28, and a rogue base station 36.

Cellular network 28 serves various communication terminals 32, such as mobile phones and wireless-enabled computers. One or more of terminals 32 may be designated as targets for surveillance by rogue base station 36. Base stations 24, rogue base station 36 and terminals 32 may communicate using any suitable communication protocol, such as Global System for Mobile Communications (GSM), Universal Mobile Telecommunications System (UMTS) or Long Term Evolution (LTE). Detection system 20 may thus be designed to detect rogue base stations that use any or all such protocols.

In the present example, system 20 comprises at least one antenna 40, a receiver (RX) 44, a transmitter (TX) 48 and a processor 52 that carries out the detection methods described herein. In some embodiments, system 20 is passive, in which case transmitter 48 is omitted. Generally, receiver 44 is configured to receive downlink transmissions from the base stations and/or uplink transmissions from the terminals in its vicinity. Transmitter 48 is typically configured to transmit uplink signals, for communicating with base stations.

The configuration of system 20 shown in FIG. 1 is an example configuration, which is chosen purely for the sake of conceptual clarity. In alternative embodiments, any other suitable system configuration can be used. Some elements of system 20 may be implemented in hardware, e.g., in one or more Application-Specific Integrated Circuits (ASICs) or Field-Programmable Gate Arrays (FPGAs). Additionally or alternatively, some elements of system 20 can be implemented using software, or using a combination of hardware and software elements. Further additionally or alternatively, some of the functions of system 20 can be implemented using off-the-shelf modem units.

Typically, processor 52 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Rogue base station 36 typically solicits terminals to reselect, e.g., by transmitting downlink signals whose transmission parameters are attractive for cell reselection. Example solicitation schemes and associated rogue base station detection techniques are described, for example, in U.S. patent application Ser. No. 13/874,332, filed Apr. 30, 2013, which is assigned to the assignee of the present patent application and whose disclosure is incorporated herein by reference. In some cases rogue base station 36 rejects a reselecting terminal unless the terminal in question is pre-defined as a target. In these cases, rogue base station 36 rejects most of the reselecting terminals.

It is possible in principle to use these properties (attractive transmission parameters and frequent rejection of terminals) as criteria for distinguishing between rogue base stations and innocent base stations. In some cases, however, rogue base station 36 may evade such detection criteria, for example by using transmission parameters similar to those of innocent base stations and/or by refraining from rejecting non-target terminals. Moreover, frequent rejection of terminals is not an exclusive property of rogue base stations, and therefore this criterion may cause a considerable number of false detections. For example, femto-cells having closed subscriber groups also reject most reselection attempts, and can easily be mis-detected as rogue base stations.

The rogue base station detection techniques described below do not rely on the above criteria, and are therefore highly reliable (in both detection probability and false-alarm probability) in distinguishing between rogue and innocent base stations.

Detecting Rogue BTS by Verifying Support of Advanced BTS Capabilities

In some embodiments, detection system 20 decides whether a suspected base station is rogue or innocent by finding out which advanced communication features are supported (or not supported) by the base station. The rationale behind this criterion is that rogue base station 36 typically does not have full base station functionality as base stations 24. For example, rogue base station 36 typically has no need to support features such as data services or frequency hopping, whereas base stations 24 are typically required to support these mechanisms. As another example, since rogue base station 36 is typically detached from network 28, it typically does not support hand-off. Base stations 24, in contrast, are typically required to support hand-off.

As yet another example, in some embodiments rogue base station 36 does not support even basic services such as incoming calls or Short Message Service (SMS), e.g., because these services involve decryption of the encryption keys used by network 28. Rogue base station 36 may try to overcome this obstacle by forwarding the calls not over network 28. In this case, however, the Calling Number details will typically be lost. Base stations 24, on the other hand, do support such basic services. As another example, in some embodiments rogue base station 36 does not support Unstructured Supplementary Service Data (USSD) features such as call forwarding controls and conference calls, which are normally supported by base stations 24. When rogue base station 36 does offer certain data services, it will typically send the data directly over the Internet and not over network 28. As such, the rogue base station loses access to some services offered by the service provider, such as Wireless Application Protocol (WAP) push services. All the above criteria can be used for distinguishing between rogue and innocent base stations.

The above criteria are given purely by way of example. Generally, system 20 may test for support of any other suitable communication feature in order to decide whether a suspected base station is rogue or innocent.

In practice, it is not always possible to decide whether a base station is rogue on the basis of a single communication feature. For example, a simple IMSI catcher may not support the full call setup signaling protocol. A more advanced rogue base station may support full call setup, but may not support data services. In this example, support or lack of support of call setup cannot be used as an absolute detection criterion. Thus, in some embodiments system 20 tests for multiple communication features, possibly one after the other, so as to increase the confidence of the decision.

In a typical flow, system 20 periodically scans the frequency band in question, constructs a list of base stations that are within range for each service provider, and tries to identify base stations that differ in parameters or behavior from the other base stations. The identified base stations are then further evaluated using the method of FIG. 2 below.

In an example embodiment, system 20 obtains, for each base station, various broadcast-channel parameters (BCCH information) such as CellID, LAC, C1, C2, signal strength and/or list of neighboring base stations. By analyzing and detecting anomalies in this information, system 20 is able to select suspected base stations for further evaluation. For example, system 20 may identify a base station that does not appear on the neighbor list of any other base station, or any other suitable anomaly.

Figure 2:
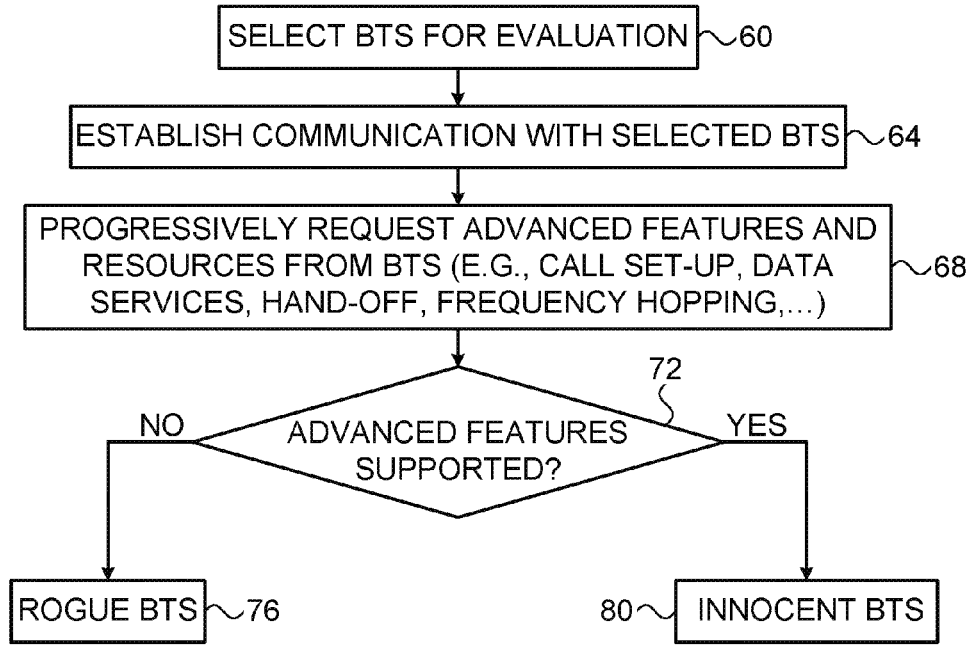
FIGS. 2 and 3 are flow charts that schematically illustrate methods for rogue base station detection, in accordance with embodiments that are described herein.

FIG. 2 is a flow chart that schematically illustrates a method for rogue base station detection, in accordance with an embodiment that is described herein. The method begins with processor 52 of system 20 selecting a base station for evaluation, which will be regarded as a "suspected cell," at a selection step 60. In an example mode of operation, system 20 carries out the method of FIG. 2 for all (or at least some) base stations in its vicinity, not only for the base stations having reselection-attractive transmission parameters. Alternatively, processor 52 may select suspected base stations for evaluation based on some suitable selection criterion.

System 20 establishes a communication session with the suspected base station, at a session setup step 64. During the communication session, processor 52 requests the suspected base station to activate various communication features, at a feature requesting step 68. Typically, processor 52 holds a definition of one or more communication features that are supported by innocent base stations and not by rogue base stations. Processor 52 requests the base station to activate one or more of these communication features. A supported feature increases the confidence that the base station is innocent, whereas a non-supported feature increases the confidence that the base station is rogue.

Thus, processor 52 checks whether the base station supports the requested communication features, at a support checking step 72. Tested features may comprise, for example, support of data services such as General Packet Radio Service (GPRS), support of frequency hopping, support of call setup and call progress in general, support of hand-off, among others. System 20 may test for support of call setup and call progress, for example, by checking the caller ID at the destination number, or by setting up a call to another modem comprised in system 20. System 20 may test for support of hand-off, for example, by sending to the base station poor Network Measurement Reports (NMRs). If hand-off is not supported, system 20 will not receive a hand-off request from the base station. If a hand-off request is received, system 20 may further verify this capability by comparing the base station list in the hand-off request to the actual list of base stations obtained in the network scan.

If not supported (e.g., upon detecting that the base station refuses to activate or otherwise refrains from activating the requested feature), processor 52 concludes that the suspected base station is rogue, at a rogue decision step 76. If supported (e.g., upon detecting that the base station has successfully activated the requested feature), processor 52 concludes that the suspected base station is innocent, at an innocent decision step 80. Processor 52 may take or initiate any suitable action upon detecting a rogue base station, such as trigger an alert to an operator.

As noted above, processor 52 may test the support of multiple communication features. In an example embodiment, processor 52 begins with testing relatively simpler features, and advances sequentially to test more complex features.

Passive Rogue BTS Detection by Identifying Duplicate Signaling Messages

In some scenarios, rogue base station 36 copies ("clones") transmission parameters of one of innocent base stations 24, and then communicates with solicited terminals using these transmission parameters. In an example scenario, after soliciting a terminal, rogue base station 36 relays communication between the terminal and one of base stations 24. In this scenario, the rogue base station impersonates the base station vis-à-vis the terminal, and impersonates the terminal vis-à-vis the base station. The terminal thus communicates with network 28 via rogue base station 36, enabling the rogue base station to monitor, block and/or modify the communication.

In cloning scenarios of this sort, signaling processes are typically performed twice, once between terminal 32 and rogue base station 36, and again between rogue base station 36 and base station 24. In some embodiments, system 20 detects such duplicate signaling and concludes that a rogue base station is present. This technique is entirely passive—System 20 only receives and does not transmit.

Figure 3:
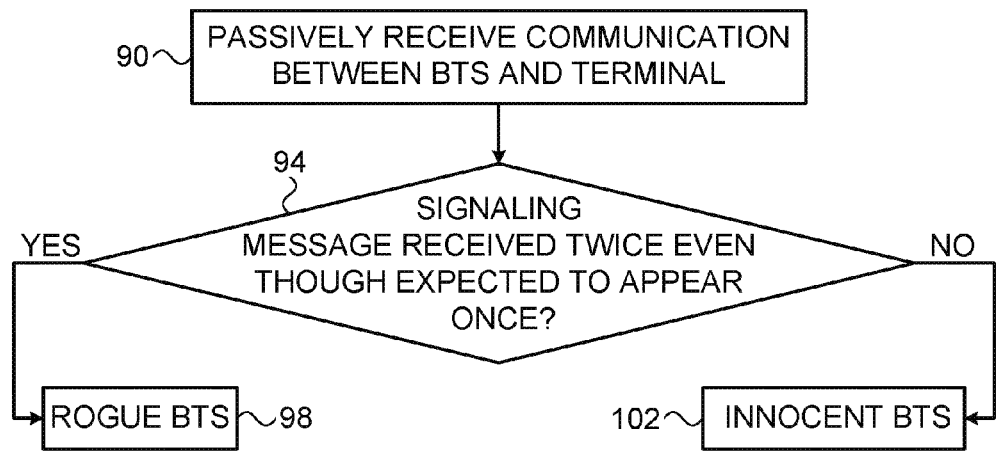

FIG. 3 is a flow chart that schematically illustrates a method for rogue base station detection, in accordance with an embodiment that is described herein. The method begins with system 20 passively monitoring communication that is exchanged between base stations and terminals, at a monitoring step 90. Monitoring typically comprises receiving both downlink channels and uplink channels.

The monitored communication complies with the communication protocol of network 28, e.g., GSM or UMTS. Processor 52 attempts to detect a signaling message that appears more than once, even though it is expected to appear only once in accordance with the protocol, at a duplicate signaling detection step 94. Duplicate signaling of this sort is likely to be caused by a rogue base station: One instance of the signaling message is exchanged between the terminal and the rogue base station, and the second instance of the signaling message is exchanged between the rogue base station and the innocent base station. Duplicate signaling messages may be detected on the uplink, downlink or both.

For example, in accordance with the GSM and UMTS protocols, when a terminal registers with a base station, it is assigned a unique Temporary Mobile Subscriber Identity (TMSI). In a cloning scenario, system 20 may intercept two signaling messages that use the same TMSI value for registering with different cells: One message is transmitted by the terminal for registering with the rogue base station, and the other message is transmitted by the rogue base station (impersonating the terminal) for registering with the innocent base station. Duplicate registration messages having the same TMSI are in violation of the communication protocol, and are highly indicative of a rogue base station.

As another example, processor 52 may identify various other duplicate signaling messages that are expected to occur only once, for example duplicate call setup process or duplicate Short Message Service (SMS) transaction vis-à-vis two cells. Any such duplicate signaling is highly indicative of a rogue base station.

If duplicate signaling is detected at step 94, processor 52 concludes that a rogue base station is present, at a rogue detection step 98. If no duplicate signaling is detected, processor 52 concludes that no rogue base station is present, at an innocent detection step 102. As noted above, processor 52 may take or initiate any suitable action upon detecting a rogue base station, such as trigger an alert to an operator.

The rogue base station identification techniques described herein can be used in a variety of applications. For example, wireless service providers may use the disclosed techniques to protect the privacy of their subscribers, to prevent fraud, and/or to comply with local regulations.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of rogue base station detection via an apparatus comprising a receiver and a processor, the method comprising:

passively monitoring, by the receiver, communication that is exchanged between one or more base stations and one or more communication terminals in accordance with a cellular network communication protocol;

searching, by the processor, for instances of a duplicate signaling message in the monitored communication by detecting in the exchanged communication whether a type of signaling message appears more than once, wherein the type of signaling message is expected to appear only once in accordance with the cellular network communication protocol, wherein detecting the type of signaling message that appears more than once includes intercepting a first signaling message of the type of signaling message that is transmitted by one of the one or more terminals to a rogue base station and a second signaling message, that is the duplicate signaling message to the first signaling message, transmitted by the rogue base station to the innocent base station, wherein the type of signaling message is one of a signaling message to register a communication terminal with a base station, a signaling message to set up a call, or a short message service transaction;

upon the duplicate signaling message being detected, triggering, by the processor, an alert to an operator that indicates that the rogue base station is present among the one or more base stations.

2. The method according to claim 1, wherein the passively monitoring of the exchanged communication comprises receiving downlink channels and uplink channels.

3. The method according to claim 2, wherein the duplicate signaling message is detecting on an uplink channel, a downlink channel, or on both.

4. The method according to claim 1, wherein the cellular network communication protocol is Global System for Mobile Communications (GSM) or Universal Mobile Telecommunications System (UMTS).

5. The method according to claim 4, wherein the first signaling message and the second signaling message use the same Temporary Mobile Subscriber Identity (TMSI).

6. The method according to claim 1, wherein the first intercepted signaling message is for registering the one of the one or more terminal with the rogue base station, and wherein the second intercepted signaling message is for registering the rogue base station with the innocent base station.

7. The method according to claim 1, wherein the first intercepted signaling message and the second intercepted signaling message are for a duplicate call setup process.

8. The method according to claim 1, wherein the first intercepted signaling message and the second intercepted signaling message are for a duplicate Short Message Service (SMS) transaction.

9. The method according to claim 1, wherein the cellular network communication protocol is Long Term Evolution (LTE).

10. Apparatus, comprising:
a receiver, which are configured to passively monitor communication that is exchanged between one or more base stations and one or more communication terminals in accordance with a cellular network communication protocol; and
a processor, which is configured to:
search for instances of a duplicate signaling message in the monitored communication by detecting in the exchanged communication whether a type of signaling message appears more than once, wherein the type of signaling message is expected to appear only once in accordance with the cellular network communication protocol, wherein detecting the type of signaling message that appears more than once includes intercepting a first signaling message of the type of signaling message that is transmitted by one of the one or more terminals to a rogue base station and a second signaling message, that is the duplicate signaling message to the first signaling message, transmitted by the rogue base station to the innocent base station, wherein the type of signaling messages is one of a signaling message to register a communication terminal with a base station, a signaling message to set up a call, or a short message service transaction; and
to trigger an alert to an operator that indicates that the rogue base station is present among the one or more base stations upon the duplicate signaling message being detected.

11. The apparatus according to claim 10, wherein the receiver passively monitors the exchanged communication by at least receiving downlink channels and uplink channels.

12. The apparatus according to claim 11, wherein the duplicate signaling message is detected by the processor on an uplink channel, a downlink channel, or on both.

13. The apparatus according to claim 10, wherein the cellular network communication protocol is Global System for Mobile Communications (GSM) or Universal Mobile Telecommunications System (UMTS).

14. The apparatus according to claim 13, wherein the first signaling message and the second signaling message use the same Temporary Mobile Subscriber Identity (TMSI).

15. The apparatus according to claim 10, wherein the first intercepted signaling message is for registering the one of the one or more terminal with the rogue base station, and wherein the second intercepted signaling message is for registering the rogue base station with the innocent base station.

16. The apparatus according to claim 10, wherein the first signaling message and the second signaling message are for a duplicate call setup process.

17. The apparatus according to claim 10, wherein the a first signaling message and the second signaling message are for duplicate Short Message Service (SMS) transaction.

18. The apparatus according to claim 10, wherein the cellular network communication protocol is Long Term Evolution (LTE).

19. A non-transitory computer readable medium having instructions stored thereon for rogue base station detection that when executed by a computing system, direct the computing system to:
passively monitor communication that is exchanged between one or more base stations and one or more communication terminals in accordance with a cellular network communication protocol;
search for instances of a duplicate signaling message in the monitored communication by detecting in the exchanged communication whether a type of signaling message appears more than once, wherein the type of signaling message is expected to appear only once in accordance with the cellular network communication protocol, wherein detecting the type of signaling message that appears more than once includes intercepting a first signaling message of the type of signaling message that is transmitted by one of the one or more terminals to a rogue base station and a second signaling message, that is the duplicate signaling message to the first signaling message, transmitted by the rogue base station to the innocent base station, wherein the type of signaling messages is one of a signaling message to register a communication terminal with a base station, a signaling message to set up a call, or a short message service transaction; and
trigger an alert to an operator that indicates that the rogue base station is present among the one or more base stations upon the duplicate signaling message being detected.

20. The transitory computer readable according to claim 19, wherein the cellular network communication protocol is Global System for Mobile Communications (GSM) or Universal Mobile Telecommunications System (UMTS), and wherein the first signaling message and the second signaling message use the same Temporary Mobile Subscriber Identity (TMSI).

* * * * *